Patented Jan. 19, 1932

1,841,797

UNITED STATES PATENT OFFICE

OTTO ERNST AND KURT SPONSEL, OF HOCHST-ON-THE-MAIN, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

HARDENED ALBUMINOUS ARTICLE AND PROCESS OF MANUFACTURING IT

No Drawing. Application filed October 25, 1927, Serial No. 228,688, and in Germany October 26, 1926.

Our present invention relates to hardened albuminous substances, more particularly to hardened casein substances which do not swell in water and process for manufacturing them.

The manufacture of artificial substances, for instance those from casein, has hitherto been carried out by preparing first a crude material composed of casein, water and a clarifying or softening agent. The crude casein material thus prepared has still the property of swelling in water and being sensible to water and it is, therefore, necessary to harden it by a treatment with a formaldehyde solution of about 7% strength, i. e. to make it resistant to water. When articles of some thickness are to be manufactured, the said hardening process requires a very long time, for instance when the work-piece has a thickness of 1 centimeter this process lasts for about one month.

We have now found that the hardening-process can be very much shortened, and even made instantaneous by using glyoxal, or a homologue or derivative thereof instead of formaldehyde for hardening the albuminous substances, for instance susbtances prepared from casein, glyadin, zein, gelatin or ossein. It is a most surprising fact that in this case the substances are rendered insoluble to the same extent but in a much shorter time. The use of glyoxal for the said purpose offers the further advantage that this product is odorless and not volatile and that, therefore, when it is used in the manner above indicated it is not injurious to the health of the persons working in the bath houses. The products thus obtained possess new and very valuable properties which become apparent particularly in a physical respect. Compared with the products hardened by means of formaldehyde those caesin products which are hardened by means of glyoxal are twice as much resistant to water; furthermore, they are unchangeable and completely resistant to acid. Glyoxal-casein body colors applied on leather do not blend, but keep a high luster even when stored in water for any length of time, whilst formaldehyde-casein body colors become brittle after a short time, and in appearance they become completely dull after storing in water for 24 hours.

By using derivatives of the glyoxal such as acetals or urea condensation products particularly also such compounds as yield glyoxal in the heat it is possible to moderate the reaction between the aldehyde and the albuminous substance, for instance casein, or the like, and to carry out the process of manufacture with continuously working machines. Consequently the former, onerous swelling-process is avoided, the reaction being advantageously conducted in such a manner that by raising the temperature a reaction is caused between the glyoxal and the casein. Thereby very clear, transparent and light-colored artificial materials are obtained.

Before the casein mixtures are worked up, there may be added thereto coloring and filling materials, carrier or flux substances. The addition of an alcohol and an acid amide, or an amine, such as urea or diphenylamine, particularly in the presence of bases, such as ammonia hydroxide or borax, to the mixture of glyoxal and casein has the effect of rendering the casein bodies homogeneous and thus it is possible to produce artificial products from casein by means of a roll-mill, or a kneading-machine with spur gearing or the like.

When using a swelling agent in the process, bivalent alcohols are particularly suitable and efficacious for this purpose.

In order to complete the reaction between the aldehyde and the amine or acid amide it is advantageous to add to the mixture a catalyst. As such catalysts, all agents known in organic chemistry to be capable of eliminating water (see f. i. Sabatier "Die Katalyse"), for instance alumina, blue tungsten oxide, are efficient. In some cases it is advantageous to add a negative catalyst to the plastic materials particularly if a slow hardening is desired.

The following examples serve to illustrate our invention, but they are not intended to limit it thereto.

1. 100 grams of rennet-casein, 2 grams of methyldiphenyl-amine, 12 grams of glyoxal of 50% strength and containing 7% of acetic acid are mixed together for 24 hours at ordinary temperature and the mass is then pressed to buttons by means of a suitable button-press. It is necessarily advantageous to apply a suitable high pressure, in general one of 1 to 1½ tons on the square centimeter.

2. 100 grams of rennet-casein, containing 15% of H₂O are mixed with 6 grams of urea, 2 grams of butylene glycol, 18 grams of a glyoxal preparation containing about 30% of glyoxal and about 8% of sodium acetate are mixed together, the resulting mass is reduced to a powder and then rendered plastic at 130° C. by pressing them in a bar-press. The bars thus formed are water-resistant and after being dried they possess a great insulating power against the electric current. Experiments have proved that 100 mol of the said nitrogen products can be hardened with about 20 to 22 mol of aldehyde.

3. 100 grams of casein, 15 grams of glyoxal butylacetal, of the probable formula:

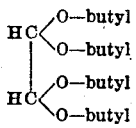

and 5 grams of urea are mixed together with water, dried and reduced to granules; the resulting mass is then made plastic at 90° C. and hardened at 150° C. The articles made from the mass so produced are highly transparent, very solid and firm and resistant to water.

If in the preceding examples the glyoxal is replaced by a more considerable quantity of glyoxal—urea-condensation products, substances are formed of an enhanced transparency and a glass-like appearance. The quantitative proportions of the two components may be so chosen that up to 66 parts of urea-glyoxal-condensation products and 33 parts of casein are used; in this case the products retain all the physical properties of casein products, except their opaqueness.

In the following claims the expression "a compound of the glyoxal group" is intended to comprise glyoxal and the condensation products derived from glyoxal and aliphatic alcohols, i. e., the so-called acetals and the condensation products derived from glyoxal and urea.

We claim:

1. The process which comprises causing an albuminous substance to react with a compound of the glyoxal group.

2. The process which comprises causing an albuminous substance to react with glyoxal-butyl-acetal.

3. The process which comprises causing casein to react with a compound of the glyoxal group.

4. The process which comprises causing casein to react with glyoxal-butyl-acetal.

5. The process which comprises causing 100 parts of rennet-casein to react with 6 parts of glyoxal.

6. The process which comprises causing 100 parts of casein to react with 15 parts of glyoxal-butyl-acetal.

7. Albuminous articles comprising the reaction product of an albuminous substance and a compound of the glyoxal group, said articles being excellently resistant to water and possessing a great insulating power against electric currents.

8. Casein articles comprising the reaction product of casein and a compound of the glyoxal group, said articles being excellently resistant to water and possessing a great insulating power against electric currents.

9. Albuminous articles comprising the reaction product of an albuminous substance and glyoxal-butyl-acetal, said articles being excellently resistant to water and possessing a great insulating power against electric currents.

10. Casein articles comprising the reaction product of casein and glyoxal-butyl-acetal, said articles being excellently resistant to water and possessing a great insulating power against electric currents.

In testimony whereof, we affix our signatures.

OTTO ERNST.
KURT SPONSEL.